United States Patent [19]

Goto

[11] Patent Number: 4,504,028

[45] Date of Patent: Mar. 12, 1985

[54] RECORDING TAPE CARTRIDGE

[75] Inventor: Shinichi Goto, Kyoto, Japan

[73] Assignee: Hitachi Maxell, Ltd., Osaka, Japan

[21] Appl. No.: 494,046

[22] Filed: May 12, 1983

[30] Foreign Application Priority Data

May 12, 1982 [JP] Japan ............................ 57-69985[U]
Feb. 8, 1983 [JP] Japan ............................ 58-17185[U]

[51] Int. Cl.³ .......................... G03B 1/04; G11B 15/32
[52] U.S. Cl. .................................. 242/198; 360/132; 220/326
[58] Field of Search ............................ 242/197–200; 220/326, 334, 339; 360/85, 95, 132, 137; 352/72, 78

[56] References Cited

U.S. PATENT DOCUMENTS

| 3,809,219 | 5/1974 | Esashi | 220/326 |
| 3,900,172 | 8/1975 | Kamaya | 242/198 |
| 3,950,787 | 4/1976 | Hosaka | 360/137 |
| 3,980,255 | 9/1976 | Serizawa | 242/198 |
| 4,323,207 | 4/1982 | Gebeke | 242/198 |

Primary Examiner—Leonard D. Christian
Attorney, Agent, or Firm—Birch, Stewart, Kolasch & Birch

[57] ABSTRACT

A recording tape cartridge having a front lid member for protecting a recording tape running along the front face of the cartridge and a lid locking mechanism for locking the lid member in a closed position, said locking mechanism being mounted in a clearance defined between a stepped side wall of the cartridge and a connecting member of the lid member for connecting the lid member on the cartridge case.

1 Claim, 4 Drawing Figures

RECORDING TAPE CARTRIDGE

FIELD OF THE INVENTION

The present invention relates to a recording tape cartridge which has a front lid member pivotally mounted on the front surface of a cartridge case for protecting a recording tape accommodated therein, and aims to smoothly and reliablely release the front lid member which is locked in a closed position.

BACKGROUND OF THE INVENTION

In a video tape cartridge such as that shown in FIG. 1, a cartridge case 1 is provided in its front surface with a tape-protecting front lid member 10 which is locked in a closed position when the tape cartridge is not used, for covering and protecting the recording surface of a video tape 2 extending along the front surface of the cartridge case 1. Between one of the side walls 15 of the cartridge case 1 and one of the connecting members 12 of the front lid member 10 which is opposed to the one of the side walls 15, there is defined a clearance 21 (see FIG. 2) for containing a locking member. The locking member functions to lock the front lid member 10 in a closed position in such a manner that, when the video tape cartridge is mounted in a video tape recorder, a locking release member provided in the video tape recorder (not shown) is inserted in the clearance 21 from the front side of the cartridge case 1 to be engaged with the locking member contained in the same, thereby releasing the front lid member 10 from the locked position.

However, since the clearance 21 is defined in a limited space between the side wall 15 of the cartridge case 1 and the connecting member 12 of the front lid member 10 and is extremely narrow in width, it is rather difficult to insert the locking release member in the clearance 21. Particularly when the video tape cartridge is mounted in the video tape recorder in a condition slightly deviating in either the right or left direction, the locking release member cannot be inserted in the clearance 21. Such inconvenience frequently arises as the video tape cartridge is made smaller with the clearance 21 being narrowed in width.

SUMMARY OF THE INVENTION

In consideration of the aforementioned disadvantage, it is an essential object of the present invention to provide an improved recording tape cartridge in which a locking release member provided in a recording/reproducing apparatus can be smoothly and easily inserted in a clearance formed in the cartridge case for facilitating the releasing of the locking of the front lid member which covers the front surface of the cartridge case.

Another object of the present invention is to provide a recording tape cartridge suitable for decreasing the size thereof.

DESCRIPTION OF THE PREFERRED EMBODIMENT

Figure 1:
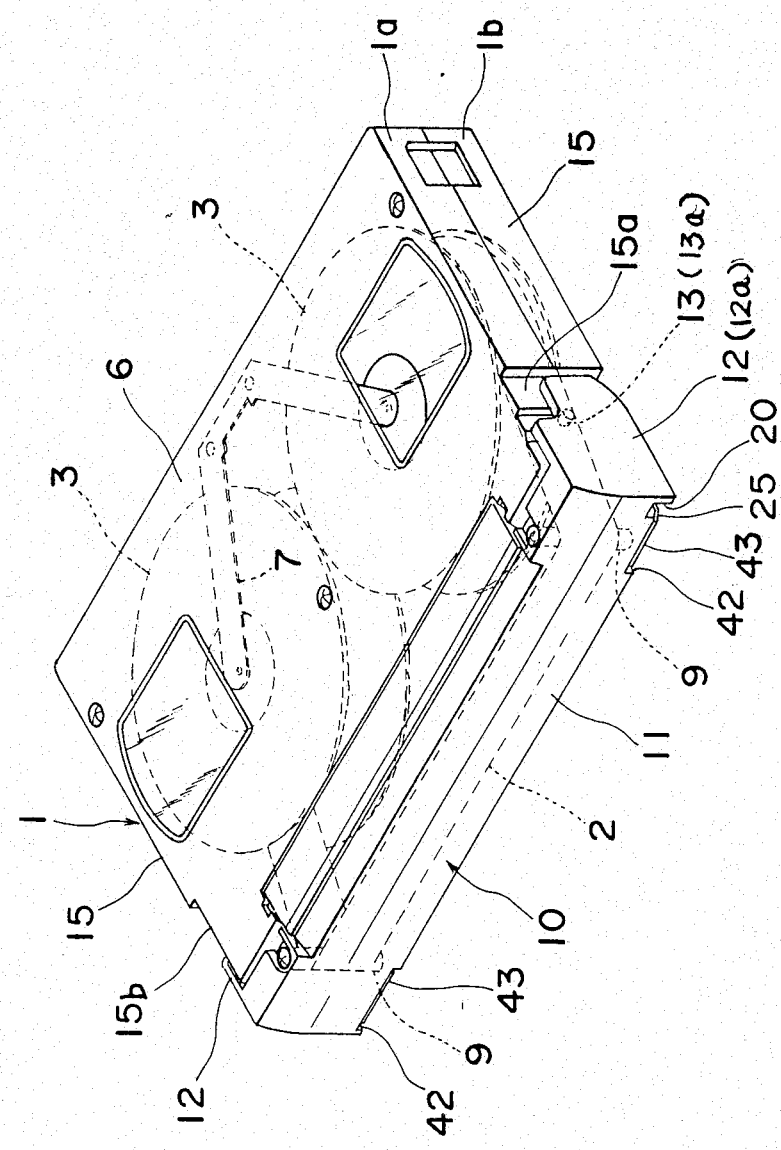
FIG. 1 is a perspective view of an embodiment of a recording tape cartridge according to the present invention.
Figure 2:
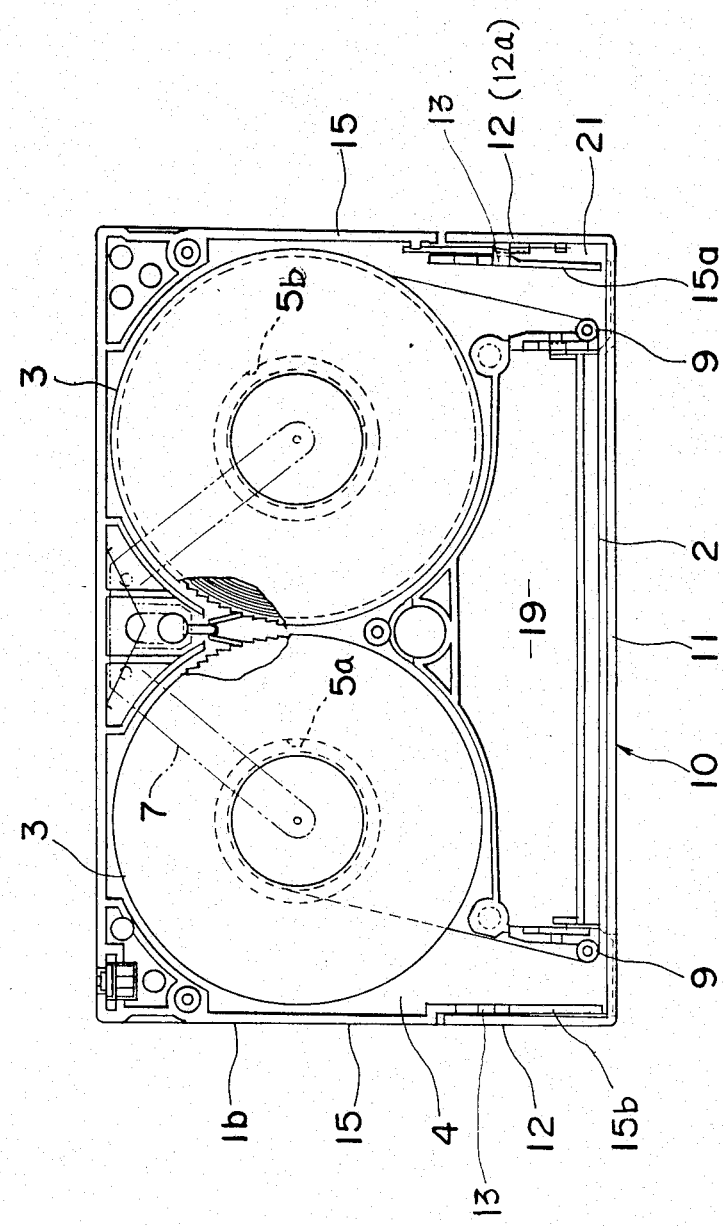
FIG. 2 is a top plan view of the video tape cartridge showing the internal construction thereof.

Referring to the drawings, there is shown a recording tape cartridge according to the present invention, which comprises a cartridge case 1 consisting of a top section 1a and a bottom section 1b formed by plastic resin material and connected with each other by screws in a butting manner. Within the cartridge case 1, there is provided a pair of tape reels 3 for winding a video tape 2 for recording and/or reproducing video signals. The tape reels 3 are downwardly pressed at their centers of rotation by a spring plate 7 which is secured to the inner surface of an upper wall member 6 of the cartridge case 1 in positions opposite to a pair of driving shaft insertion holes 5a and 5b defined through a bottom wall member 4 of the cartridge case 1, so that driving shafts (not shown) of the video tape recorder are engaged with hub openings of the tape reels 3 through the insertion holes 5a and 5b when the cartridge case 1 is mounted in the video tape recorder. A pair of tape guide members 9 are provided on both sides in the front part of the cartridge case 1 for guiding the video tape 2, which is drawn out from one tape reel 3 along the front surface of the cartridge case 1 and wound around the other tape reel 3.

A front lid member 10 for covering the front surface of the cartridge case 1 is pivotally connected to the cartridge case 1 in a manner capable of being opened and closed.

The front lid member 10 is formed of a plastic resin material, and comprises a front plate 11 for covering the cartridge case 1 longitudinally along the front surface thereof, a pair of connecting members 12a and 12b rearwardly projecting from both sides of the front plate 11 and a pair of pivotal shafts 13a and 13b inwardly projecting from the connecting members 12a and 12b to be opposite to each other. The connecting members 12a and 12b are engaged in stepped wall members 15a and 15b defined in front portions of a pair of side walls 15 of the cartridge case 1 in a manner stepped inwardly of the side walls 15 while the pivotal shafts 13 are rotatably engaged in through-holes 16 formed through the stepped wall members 15a and 15b. Thus, the front lid member 10 is pivotally rotatable about the pivotal shafts 13a and 13b between a closed position for covering the front surface of the cartridge case 1 and in an upwardly opened position.

As hereinafter described in detail, the front lid member 10 is urged by a torsion spring 17 to be in the closed position. When the video tape cartridge is not used, the front lid member 10 is closed to cover the front surface of the cartridge case 1 and protect the recording surface of the video tape 2. When, in turn, the cartridge case 1 is mounted in the video tape recorder, the front lid member 10 is opened so that a tape loading pin (not shown) of the video tape recorder is inserted in a pocket member 19 formed in the front part of the cartridge case 1 in a recessed manner for drawing out the video tape 2 frontwardly along the cartridge case 1.

A substantially square-shaped recess 20 is formed in the lower end portion of the front plate 11 of the front lid member 10 in the right-hand direction while a clearance 21 communicating with the recess 20 is defined between the stepped wall member 15a of the right-hand side wall 15 and the right-hand connecting member 12 of the front lid member 10 to contain a device for locking the front lid member 10 in the closed position when the video tape cartridge is not used.

Figure 3:
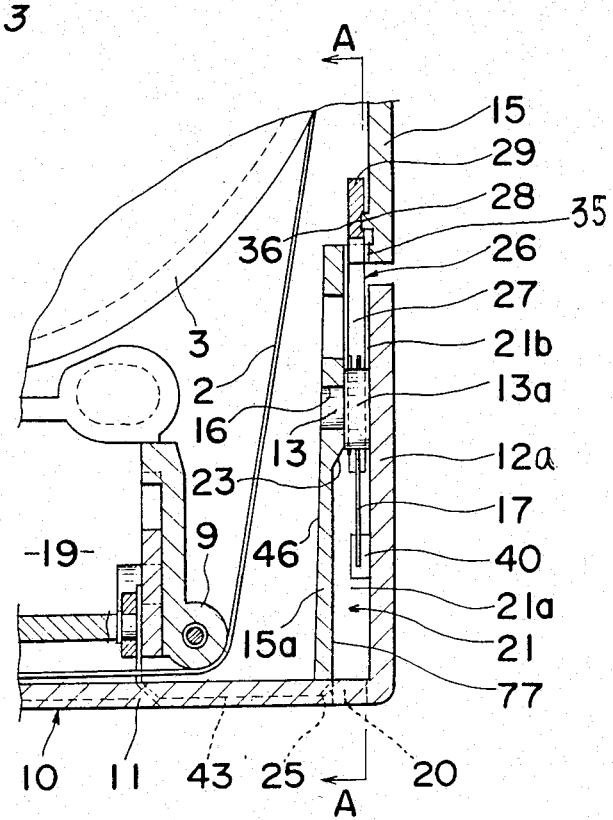
FIG. 3 is a partially enlarged top plan view showing an essential portion of the video tape cartridge.

In FIG. 3, the stepped wall member 15a of the right-hand side wall 15 is made thin in its front half portion through a stepped slanting surface 23 in the longitudinal center of its outer side surface so that the clearance 21 is wide in a front portion 21a frontwardly of the stepped slanting surface 23 and narrow in a rear portion 21b rearwardly of the stepped slanting surface 23. That is, the stepped slanting surface 23 is formed forwardly of the through-holes 16 along the vertical direction, and with respect to the wide front portion 21a and the narrow rear portion 21b of the clearance 21, the stepped wall member 15a and the connecting member 12a of the front lid member 10 are opposed to each other in a parallel manner in top plan view. In this embodiment, in the left-hand side of the wide front portion 21a of the clearance 21, i.e., the front end portion of the stepped wall member 15a facing the recess 20 is bevelled so as to form a slanting guide surface 25 extending downwardly. A projecting base portion 13a of a pivotal shaft 13 protruding from the right-hand connecting member 12a of the front lid member 10 is brought into contact with the outer surface of the stepped wall member 15a to keep the lateral width of the narrow rear portion 21b constant. In the narrow portion 21b, the lid locking device is provided.

Figure 4:
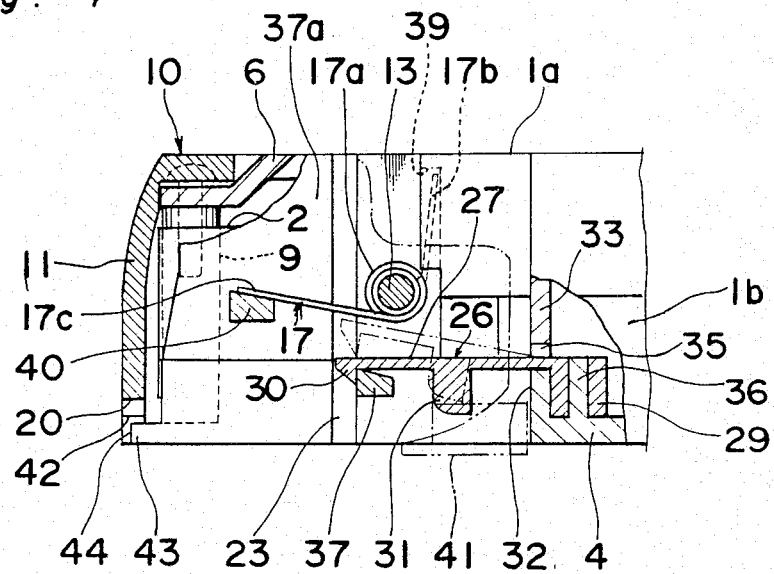
FIG. 4 is a cross sectional view taken along the line A—A in FIG. 3.

As shown in FIGS. 3 and 4, the locking member 26 is formed by elastically deformable plastic resin material, which comprises a thin flat plate 27, a base end member 29 downwardly projecting from the base end portion of the flat plate 27 and having a longitudinal groove 28, an engaging pawl 30 projectingly formed in the lower surface of the forward end of the flat plate 27 and a pressed member 31 projectingly formed in the lower surface of the longitudinal center of the flat plate 27. The innermost wall of the clearance 21 is defined by a lower wall member 32 formed in the bottom section 1b and an upper wall member 33 formed in the top section 1a butting against each other via a through-hole 35, and the right-hand side wall 15b of the cartridge case 1 has a vertical rib 36 projectingly provided in the lower end of its inner surface close to the lower wall member 32. The locking member 26 is fitted in the bottom section 1b prior to assembling of the top section 1a and the bottom section 1b. That is, the base end member 29 of the locking member 26 is inserted in the interior of the lower wall member 32 of the bottom section 1b from above to bring the longitudinal groove 28 into sliding engagement with the vertical rib 33. Then the top section 1a is assembled with the bottom section 1b to be connected therewith by screws in such a manner that the lower surface of the upper wall member 33 of the top section 1a is brought into contact with the upper surface of the flat plate 27 of the locking member 26 to prevent the base end portion of the flat plate 27 from being raised. Thus, the base end member 29 of the locking member 26 is supportedly fixed to the cartridge case 1 in a cantilever manner, so that the flat plate 27 is substantially horizontally extended into the narrow rear portion 21b of the clearance 21 via the through-hole 35. In this condition, when the lid member 10 is closed, the flat plate 27 of the locking member 26 is positioned below the pivotal shaft 13 such that the engaging pawl 30 is located forward of the pivotal shaft 13 to be engaged, by virtue of the elasticity of the flat plate 27, with an engaging member 37 projectingly formed in the inner surface of the right-hand connecting member 12a of the front lid member 10 from above. In particular, the pressed member 31 of the locking member 26 is arranged to be in the narrow rear portion 21b of the clearance 21. With respect to the aforementioned torsion spring 17, a coiled portion 17a is engaged on the pivotal shaft 13 and an end portion 17b of the spring 17 is engagedly supported within a vertical groove 39 formed in the outer surface of the stepped wall member 15a of the right-hand side wall 15 while the other end portion 17c is engaged with a spring bearing 40 provided in the inner surface of the right-hand connecting member 12a of the front lid member 10.

In such a condition, the engaging pawl 30 in the forward end of the locking member 26 is continuously engaged with the engaging member 37 of the front lid member 10 from above to prevent the front lid member 10 from being rotated about the pivotal shafts 13 to the opened position, thereby locking the same in the closed position. When the video tape cartridge is mounted in the video tape recorder with the front lid member 10 closed in the aforementioned manner, a locking release member 41 fixed in the video tape recorder is inserted in the clearance 21 through the recess 20 of the front lid member 10 and presses the front lower end of the pressed member 31 of the locking member 26. By virtue of this, the flat plate 27 of the locking member 26 is elastically deformed upwardly from its base end portion, so that the engaging pawl 30 is disengaged from the engaging portion 37 of the front lid member 10, thereby releasing the front lid member 10 from being locked in the closed position.

It is noted that the position of the recess 20 formed in the front plate 11 of the front lid member 10 is preferably set such that the locking release member 41 is guided to be close to the left-hand direction in FIG. 3, i.e., close to the stepped wall member 15a of the right-hand side wall 15 rather than to the center of the clearance 21. Then, even if the video tape cartridge is mounted in the video tape recorder with deviation in the right or left direction, the locking release member 41 is first brought into contact with the slanting guide surface 25 through the recess 20 and then inserted in the wide front portion 21a of the clearance 21 with leeway, to be in contact with the stepped slanting surface 23 and accurately guided toward the narrow rear portion 21b to appropriately press the pressed member 31 of the locking member 26.

Referring to FIG. 4, in portions close to both ends of the front plate 11 of the front lid member 10, i.e., in the lower ends of the portions through which the video tape 2 is frontwardly drawn out, there are recessedly formed openings 42 while projections 43 are protrudingly formed in the front edges of the bottom wall member 4 of the cartridge case 1 to face the openings 42 such that a forward butting surface 44 of each projection 43 is positioned at the middle of the thickness of the front plate 11. By virtue of this, aligning members (not shown) of the video tape recorder are brought into contact with the projections 43 through the openings 42 to properly restrict the position of the video tape cartridge in the video tape recorder at two points when the video tape cartridge is mounted in the video tape recorder. Since the forward butting surface 44 of each projection 43 is positioned at the middle of the thickness of the front plate 11, even if the video tape cartridge is repeatedly mounted in and removed from the video tape recorder to abrade or scratch the forward butting surface 44, such abrasion or scratches are inconspicuous. Further, the front lid member 10 is effectively prevented from receiving dust or dirt in the interior thereof through the openings 42. Particularly since the right-hand opening 42 is formed in series with the recess 20, which, in turn, is upwardly extended, the slanting guide surface 25 faces the front outer surface of the front lid member 10 keeping in contact with the forward butting surface 44 of the projection 43 even when the front lid member 10 is in the closed position, thereby allowing the locking release member 41 to be in contact with the slanting guide surface 25.

The locking release member 41 also functions to prevent erroneous mounting of the video tape cartridge by smoothly entering the clearance 21 through the recess 20 when the video tape cartridge is properly mounted in the video tape recorder while being in contact with other portions to interfere therewith when the video tape cartridge is mounted in the video tape cartridge in a laterally or vertically inverted condition, thereby preventing erroneous mounting of the video tape cartridge.

A vertical inner side surface 46 of the stepped wall member 15a of the right-hand side wall 15b is slanted toward the central portion of the cartridge case 1 along the frontward direction in top plan view so that the video tape 2 is drawn in the interior of the cartridge case 1 along the inner side surface 46 of the stepped wall member 15a even if the video tape 2 is loosened in the inner side of the right-hand tape guide member 9, thereby preventing the video tape 2 from being loosened.

As hereinabove described, the video tape cartridge shown in the embodiment of the present invention is so formed that the clearance 21 defined between the side wall 15 of the cartridge case 1 which receives the locking member 26 for the front lid member 10 and the connecting portion 12 of the front lid member 10 is stepped to have a wide front portion 21a and a narrow rear portion 21b. Therefore, even if the video tape cartridge slightly deviates in either left-hand or right-hand direction when being mounted in the video tape recorder, the locking release member 41 of the video tape recorder can be easily inserted in the clearance 21 having the wide entrance through the recess 20 of the front lid member 10. Upon such insertion in the clearance 21, the locking release member 41 is effectively guided toward the narrow rear portion 21b of the clearance through the stepped slanting surface 23 to be properly in contact with the pressed portion 31 of the locking member 26. Particularly since the frontwardly-extending slanting guide surface 25 is formed at least in either the right-hand or left-hand side of the front end opening of the wide front portion 21a of the clearance 21 for guiding the locking release member 41, the locking release member 41 can be further smoothly inserted in the clearance 21. Thus, the present invention is particularly effective in a small-sized recording tape cartridge which bears merely a small space in design for the clearance 21.

It is to be noted that of the present invention is not limited to video tape cartridges alone, and can be applied to various types of recording tape cartridges.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. In a recording tape cartridge comprising:
   a cartridge case formed by a top section and a bottom section assembled together with a front face of the cartridge case opened,
   a front lid member having a front plate with a recess formed in a lower end portion thereof and connecting members projecting rearward from both side end portions of said front plate, said front lid member being pivotally connected to said cartridge case in a manner capable of being opened and closed for closing the front face of the cartridge case,
   a clearance defined between one of two side walls of said cartridge case and one of said connecting members opposing to said one side wall so as to face said recess,
   and locking means for locking said front lid member in a closed condition, said locking means being provided with a pressed portion for engagement by a locking release member of a recording device and arranged in the above defined clearance so that said locking release member of said recording device entering said clearance through the recess of said front lid member is brought into contact with said pressed portion of said locking means for releasing said lid locking means, said clearance being formed with a wide front portion and a narrow rear portion having a boundary connected by a slanting surface for guiding entrance of said locking release means, said pressed portion of the locking means being arranged in said narrow rear portion.

* * * * *